3,414,498
CROSS-LINKING OF POLYMERIC SUBSTANCES WITH ACETYLENE AND IONIZING RADIATION
Yasuo Shinohara and Kenji Yamaguti, Ohtsu-shi, and Teruo Nagai, Seta-machi, Kurita-gun, Japan, assignors to Toyo Rayon Kabushiki Kaisha, Tokyo, Japan, a corporation of Japan
No Drawing. Filed Mar. 30, 1964, Ser. No. 355,942
Claims priority, application Japan, Apr. 9, 1963, 38/18,765; Aug. 7, 1963, 38/40,636
9 Claims. (Cl. 204—159.13)

ABSTRACT OF THE DISCLOSURE

A process for reforming a polymer by cross-linking which comprises the steps of subjecting a high polymer to irradiation by ionizing radiation and setting up cross-linkages therein to reform said polymer, said process including the step of contacting the polymer with acetylene for a period before, during or after the irradiation step.

---

This invention relates to improvements in the process for reforming the natural or synthetic high polymers by cross-linking using ionizing radiations and in particular to a cross-linking reformation process for polymers by which the cross-linking reaction can be accelerated to a marked degree.

More specifically, the invention relates to a process for reforming polymers by cross-linking which is characterized in that, in reforming high polymers by subjecting them to irradiation by ionizing radiations to set up cross-linkages therein, said polymers are brought into sufficiently intimate contact with acetylene at least during one of the periods of before, during or after the irradiation.

The polymeric materials, generally speaking, exhibit an enhancement in their resistances to heat, oil, water, shock, abrasion and fatigue as an increase in their cross-linkages occur. In addition, since they are imparted resistances to chemicals as well as solvents, the cross-linked polymeric materials are not only used for common articles but have a wide use as industrial materials as well.

It is well known heretofore to reform polymeric materials by subjecting them to irradiation with ionizing radiations to effect cross-linkages to occur therein.

In these reformation processes, it was necessary however to employ conditions of considerable harshness with respect to the irradiation temperature and dosage for effecting the cross-linking to occur to a sufficient extent from the practical standpoint, though there was some differences depending on the class of polymer, the molecular weight, degree of crystallinity and other factors. Hence, there was not only involved the difficulty from the operational standpoint, but also instances in which the desirable qualities possessed by the original polymer would be greatly impaired. In extreme cases there occurred instances in which even the object of reformation had to be sacrificed.

For the purpose of avoiding these disadvantages, there have been proposed reforming processes in which attempts have been made to decrease the irradiation dosage by irradiating the polymer in the presence of chlorobenzene or a process in which the polymer is mixed with a monomer having a polyfunctional radical, such as allylmethacrylate or ethylene glycol dimethacrylate, and then irradiated. However, even with these processes a considerably high irradiation dosage was still necessary for accomplishing a sufficient cross-linking to take place in the polymer. And, depending on the polymer, the appearance of undesirable qualities along with the reformation by means of cross-linking could not be avoided. Further, in carrying out these processes commercially there was, for example, the difficulty technically of mixing the promoter uniformly in the polymer and also the undesirability from the economical standpoint.

As a result of our research for a process for reforming high polymers by cross-linking by means of ionizing radiations, whereby the technical difficulties possessed by the conventional processes could be overcome and reformation could be accomplished commercially with exceeding advantage and effectiveness, we found that by bringing the polymer into sufficiently intimate contact with acetylene during at least one of periods of before, during or after the irradiation a very improved accelerative action of the cross-linking reaction could be obtained with mild irradiation conditions and that said contact could be carried out either with a gaseous phase acetylene such as acetylene singly or acetylene enveloped by an inert gas, or in the liquid phase in which acetylene is dissolved in a suitable inert solvent.

An object of the present invention therefore is to overcome the shortcomings existing in the conventional processes for reforming polymers by cross-linking by means of ionizing radiations and to provide an improved process for reforming polymers by cross-linking by which the cross-linking reaction can be greatly accelerated with mild irradiation conditions.

Other objects and advantages of the invention will be apparent from the following description.

The high polymers to which the process of the present invention can be applied involve all polymers (including copolymers), both natural and synthetic (including artificial), and the mixtures thereof; for example, the process is conveniently applied to the polyamides such as nylon-6, nylon-66, etc.; the polyolefins such as polyethylene, polypropylene, poly-4-methylpentene-1, etc.; the polyvinyl compounds such as polyacrylic acid esters, polymethacrylic acid esters, polyacrylonitrile, etc.; and the polymeric substances whose polymer component is predominantly the diolefins having a conjugated double bond, such as polybutadiene, polyisoprene, Buna rubber, SB rubber, etc.

While the effectiveness of the process of the present invention with respect to the effects of the ionizing radiation is pronounced in the case of the polymers belonging to the cross-linked type, it can also be applied to those types of polymers which disintegrate if the operation is restricted to just irradiation alone, such as, for example, cellulose, which it causes to gel. Further, these polymeric materials may contain such additives as the various stabilizers or other cross-linking accelerators, or they may be those which have been dyed or those which have been imparted a resin treatment or other treatments. In addition, in applying the invention process, the polymer to be treated may be in their raw material form such as powders, granules, pellets or flakes, or they may be in the form of fibers, textile fabrics, films or other shaped structures. For example, for obtaining uniformity in the cross-linkages to the interior of a thick-shelled shaped structure, it is advisable that the invention process be applied to the raw material form. On the other hand, when a shaped structure of sufficiently high softening point is to be made, it is preferred that the shaped structure be made first and then the treatment of the present invention be applied, since the molding would become difficult if the invention treatment were to be applied to the polymer in its raw material form.

The ionizing radiations as used in the process of this invention are the alpha, beta, gamma, electron, proton and deuteron rays as well as other discharged particles, such as neutron, X and ultraviolet rays, and/or the mixtures of these rays. These rays can be obtained from the natural and artificial radioactive isotopes, the accelerators of charged particles and electron generators such as the Van de Graaff's generator, X-ray generator, nuclear reactor and other sources of rays.

According to the present invention, in subjecting one of the foregoing polymers to irradiation of a prescribed dose of an ionizing radiation, said polymer is brought into sufficiently intimate contact with acetylene at least during one of the periods of before, during or after the irradiation.

Accordingly, the invention process can be practiced by one of the methods such as the below-listed (a)–(d).

(a) The polymer to be treated is irradiated in advance with an ionizing radiation and then brought into sufficiently intimate contact with acetylene.
(b) The polymer is irradiated with an ionizing radiation under conditions in which it is in intimate contact with acetylene.
(c) The polymer is first brought into intimate contact with acetylene and said polymer is caused to adsorb or absorb the acetylene sufficiently, after which it is irradiated with an ionizing radiation.
(d) The operation is carried out by suitably selecting and combining the foregoing methods (a)–(c).

First, the (a) method will be described:

This method is the simplest and is the preferred from the economical standpoint. In this case, the most preferably used ionizing radiation is one which is simple and has a low cost, for example, the electron rays from an electron ray accelerator. While the dosage irradiated will vary depending on such conditions as the class of the polymer to be treated, its degrees of crystallinity and elongation, irradiation temperature, degree of cross linking desired and the conditions under which contact is made with the acetylene, the dosage that suffices is considerably milder that that required when irradiation alone is performed, conditions being identical. As a practical matter, normally a range of about 0.01–20 mrads, and preferably 0.1–10 mrads, is utilized. Needless to say, a much greater dosage can also be used.

Further, the atmosphere in which the irradiation is carried out may be in open air, or it may be in a substantial absence of oxygen, such as in vacuum or a nitrogen current. However, when the irradiation is to be carried out over an extended period of time using a source of radiation producing a weak dose rate, the irradiation is preferably accomplished in the absence of oxygen.

The irradiation temperature can also be varied to an extent that the polymer to be irradiated is not damaged depending on such conditions as the class of polymer and its configuration, the dosage irradiated and the degree of cross-lining desired. The temperature employed is however considerably milder than that employed conventionally under identical conditions.

It is undesirable to allow the irradiated polymer to remain in contact with oxygen for a long period of time prior to effecting its intimate contact with the acetylene, for the reason that the active points set up by means of the irradiation will lose their activity prior to their being subjected to the cross-linking action of the acetylene and hence bring about a decrease in the cross-linking effects. In this case, while the polymers whose irradiation has been completed may be held in an atmosphere where it does not come in contact with oxygen and/or at low temperature, preferably the polymer, after irradiation, should be brought into contact with acetylene as soon as possible.

Next will be explained the most important feature of the present process—the effecting of the intimate contact of the polymer with acetylene.

The acetylene can be utilized in the gaseous or liquid phase, it being possible to use acetylene gas alone, or as a mixed gas with an inert gas which does not induce explosion, such as nitrogen or argon, or as an inert solvent solution of acetylene. As such inert solvents, included are, for example, water, alcohol, ether, benzene and acetone.

In using acetylene in its gaseous phase, while the gas pressure can be chosen as desired, usually a pressure of several tens of mm. Hg, 2 and 3 atmospheres is used.

On the other hand, when used in the form of a solution, a concentration of about 0.01–20 g./l., and preferably about 0.1–2 g./l. is suitable. When the acetylene is to be used in this form, its use as an aqueous solution produces the greatest cross-linking accelerative effect, the desirable range of the acetylene concentration in this case being the same as that generally used for the solution form. In dissolving the acetylene gas in a solvent, since the cross-linking effect is not enhanced very much even though the concentration is raised by application of pressure, there is no particular need to raise its concentration. In any event, the absolute amount of the acetylene to be contacted with the polymer to be treated is preferably an amount at least above 0.001% by weight of the high polymer.

The contact of the polymer to be treated and acetylene must be effected substantially intimately. While the contact temperature and time is varied depending on such conditions as the interrelationship of the temperature and time, the class of polymer and its configuration, the irradiation dose, the degree of cross-linking desired, the concentration and phase in which the acetylene is used and the method of contact, normally a temperature of the order of about from −30 to 100° C., and preferably a temperature of the order of room temperature to 60° C., is used By raising the contact temperature the cross-linking reaction is accelerated so that shortening of the treatment time is made possible.

The contact time may also be varied. Generally speaking, when the cross-linking of a thick article is to be effected, a longer period of time is required.

As compared with the process in which the polymer is only subjected to irradiation of an ionizing radiation, the invention process makes it possible to effect the sufficient cross-linking for reforming a polymer with an irradiation dosage which is smaller than that required in the former case. In addition, since the substance used is the inexpensive acetylene and the processing steps are simple, the cross-linking operation becomes commercially feasible. Thus, it becomes possible to set up sufficient cross-linkages for desirably reforming the polymer, with considerably milder irradiation conditions than that of the conventional processes and without any risk of causing the undesirable degradation of the polymer. The embodiment in which acetylene is used as an aqueous solution has the merits not only in that the commercial cross-linking and reformation operation can be carried out with great advantages because of the simplicity of the processing steps and the use of the low-cost materials of acetylene and water, but also in that the hazards such as explosion and toxication can be favorably controlled since the dangerous acetylene is used in a state of its coexistence with water.

Method (b) will be explained next:

By this method a high degree of cross linking can be obtained with the use of a small irradiation dose. While 50 mrads is required for the cross linking of nylon by just only its irradiation at room temperature, according to the present process only 0.1 mrad will do.

According to this method, the polymer is subjected to irradiation of an ionizing radiation while in intimate contact with acetylene, it being permissible for the acetylene to be in a state as in the case of method (a). It however is most suitably used in the gaseous state.

The preferred procedure according to this method comprises placing the polymer in acetylene gas and irradiating it with, for example, X-rays or gamma rays from $Co^{60}$. Particularly, in the method in which the irradiation of nylon fibers is by means of gamma rays, if the method is applied, for example, by winding 1 kg. of the fibers onto a bobbin, the cross linking uniformly of the fibers to that part wound in the interior can be accomplished. As in the case of method (a), the dose to be irradiated in this method will also vary in accordance with the class of polymer, the degree of cross-linking desired and the conditions under which contact is made with acetylene. However, the cross-linking is accomplished with a considerably lesser dose than required by the conventional processes. As a practical matter, a range of the order of about 0.01–20 mrads can be utilized. Although steam and other gases which do not hinder the cross-linking reaction may be mixed with the acetylene gas during the irradiation, the presence of a large amount of oxygen is undesirable.

The (c) method, on the other hand, can be conveniently utilized when the configuration of the polymer to be treated is thick. According to this method, the dose to be irradiated is very effectively utilized by subjecting the polymer to irradiation after having first thoroughly impregnated the polymer to its interior with the acetylene. This embodiment is effectively carried out when the acetylene is used as a solvent solution, particularly an aqueous solution.

It goes without saying, as previously stated, that the hereinbefore-described methods (a), (b) and (c) can be used in suitably chosen combinations.

The polymeric material reformed by the process of the present invention can be utilized for various purposes. For example the cross-linked polymer, when used as a plastic, maintains its shape without melting and liquifying even though it is heated to above its melting point. When the synthetic fibers to which the process of this invention has been applied are made into knitted or woven fabrics or when the invention process has been directly applied to knitted or woven fabrics, a conspicuous improvement in their resistance to heat is observed. For example, in the case of the polypropylene fiber, an improvement is seen in its resistance to heat, which is its inherent fault and, on the other hand, in the case of nylon, a marked improvement is seen in its property of melting as a result of friction. Further, in the case of polyethylene film, for example, biaxially stretching becomes possible so that a more transparent and tough film can be made. Again, in the case of nylon, for example, when that to which the invention process has been applied is used as a tire cord, there is observed a marked enhancement of its resistance to fatigue and of its tendency to creep.

In addition, the invention process overcomes the drawback of the conventional processes, in that there is practically no degradation at all in the other properties besides those that have been improved, for example, in the strength of the polymer at room temperature, and hardly any change in such properties as hygroscopicity, dyeability and the many other properties is observed. This point also is one of the merits of the present process which is characterized in that a small dose of irradiation suffices. If, for example, nylon is subjected to an ionizing radiation of 50–100 mrads in accordance with a conventional process, while it is possible to impart a considerable amount of cross linkages to the nylon, at the same time a pronounced degradation in its strength at room temperature cannot be avoided.

As to the function of acetylene in the process of this invention, it is conceivable that acetylene itself acts as a crosslinking component at the active points that are set up in the polymer by means of the irradiation of an ionizing radiation, but when judged from the fact that there are instances in which hardly any change in the weight of the resulting polymer nor consumption of the acetylene can be observed, it is believed that it merely acts as a crosslinking accelerating agent. However, the details of the mechanism involved is not completely clarified as yet. In any event, it is to be understood that the present invention is not to be limited in the least by such a presumptive mechanism.

To further illustrate the present invention the following examples of several methods of practicing the invention are given, it being understood that these are merely intended to be illustrative and not in limitation of the invention.

Throughout the present specification, the degree of cross linking attained is represented by means of the rate of gelled portion, which is measured and calculated as follows:

Namely, a sample polymer which has received a cross-linking treatment is dried and its pre-extraction weight is determined. Then this polymer is dipped for a prescribed number of hours at a prescribed temperature in a solvent such as mentioned in the examples, after which it is subjected to an extraction treatment by replacing and washing its sol portion with such as methanol or acetone, followed by vacuum drying for about 16 hours and then weighing. The rate of the gelled portion is calculated from these measured values by the following Equation 1:

$$\text{Rate of gelled portion} = \frac{\text{post-extraction weight}}{\text{pre-extraction weight}} \times 100\%$$

EXAMPLE 1

Polyethylene films obtained by the high and low pressure processes were subjected to irradiation of electron rays in open air at room temperature by means of the Van de Graaff's electron ray accelerator, after which they were immediately brought into contact with acetylene of 1 atmosphere and then held for 2 hours at room temperature in an atmosphere of acetylene of 1 atmosphere, whereupon results as shown in the following Table I were obtained. By way of comparison, instances in which no contact is had with acetylene are also shown.

TABLE I
[Rate of Gelled Portion, Percent]

| Polymer | Dose Irradiated | | | | |
|---|---|---|---|---|---|
|  | 2 mrads | 5 mrads | 7 mrads | 10 mrads | 15 mrads |
| Polyethylene (High pressure process) [1] | 0 (0) | 28 (8.5) | 34 (28) | 42 (37) | 54 (50) |
| Polyethylene (Low pressure process) [2] | 25 (0) | 43 (22) | 46 (30) | 58 (47) | 69 (59) |

[1] Measurement conditions under which rate of gelled portion was determined: Solvent xylene; temperature 100° C; time 20 hours.
[2] Measurement conditions under which rate of gelled portion was determined: Solvent xylene; temperature 110° C; time 20 hours.
NOTE.—The values in parentheses are those of ploymers which had been subjected to irradiation only, no contact being had with acetylene.

From the results shown in Table I above, it can be seen that, according to the process of this invention, considerably improved cross-linking effects are obtained with a mild dosage of irradiation, though there is differences in degree depending on the class of polymer.

Example 2

In the following Table II are shown the rates of gelled portion obtained when the films or fibers of the various types of polymers listed therein were subjected to irradiation of electron rays in open air by means of the Van de Graaff electron accelerator, after which they were immediately dipped in an acetylene saturated aqueous solution and then allowed to stand for 2 hours at room temperature. Also shown, on the other hand, are the rates of gelled portion obtained when only irradiation was performed as well as the instance when subsequent to irradiation, the films or fibers were held in acetylene gas for 2 hours at room temperature.

TABLE II

| Polymer | Treatment Conditions | Rate of Gelled Portion, Percent | | | | Rate of Gelled Portion Measurement Conditions |
|---|---|---|---|---|---|---|
| | | Dose Irradiated | | | | |
| | | 0.5 mrad | 1 mrad | 2 mrads | 5 mrads | |
| Polyethylene (High pressure process) | Acetylene aqueous solution | 0 | | 26 | 40 | Xylene, 100° C., 20 hours. |
| | Acetylene gas | 0 | | 10 | 28 | |
| | Irradiation only | 0 | | 0 | 17 | |
| Polyethylene (Low pressure process) | Acetylene aqueous solution | 0 | | 36 | 47 | Xylene, 100° C., 20 hours. |
| | Acetylene gas | 0 | | 24 | 39 | |
| | Irradiation only | 0 | | 0 | 26 | |
| Nylon 6 (Undrawn film) | Acetylene aqueous solution | 73 | 84 | 91 | 95 | m-Cresol, 90° C., 4 hours. |
| | Acetylene gas | 40 | 48 | 57 | 70 | |
| | Irradiation only | 0 | 0 | 0 | 0 | |
| Polypropylene | Acetylene aqueous solution | | | 11.5 | | Tetralin, 135° C., 2 hours. |
| | Irradiation only | | | 0 | | |
| Polyacrylonitrile | Acetylene aqueous solution | 0 | 3 | 28 | 64 | Dimethylformamide, 50° C., 2 hours. |
| | Irradiation only | 0 | 0 | 0 | 17 | |
| Rayon | Acetylene aqueous solution | 18 | 23 | 30 | 47 | Copper ethylene diamine, 20° C., 20 hours. |
| | Irradiation only | 0 | 0 | 0 | 0 | |
| Vinylon | Acetylene aqueous solution | 0 | 0 | 30 | 53 | Formic acid, 90° C., 2 hours. |
| | Irradiation only | 0 | 0 | 0 | 0 | |

It can be seen from the results shown in Table II, above, that according to the invention process markedly superior cross-linking effects can be obtained with considerably milder dosages of irradiation than in the case when irradiation is used alone, and further that cross-linking effects which are still more marked can be obtained by the embodiment in which acetylene is used as an aqueous solution.

Example 3

This example illustrates the effect of the acetylene treatment time. Table III shows the rates of gelled portion in accordance with treatment time when a nylon-6 tire cord, after being subjected to irradiation of 1 mrad of electron rays in open air by means of the Van de Graaff electron accelerator, was dipped in an acetylene saturated aqueous solution. On the other hand, in Table IV are shown the rates when the nylon-6 tire cord was similarly irradiated but subsequently held in acetylene gas. From the results obtained, it can be seen that the mode of treatment in which acetylene is used as an aqueous solution accelerates the cross-linking speed considerably as compared with the method of treatment which uses the acetylene in a gaseous state.

This example shows that about 5 minutes is sufficient for carrying out the treatment with the aqueous solution of acetylene. This, of course, will vary considerably depending on the thickness of the sample, it being necessary to increase the treatment time when the sample is thick. In fact, if a thick sample is given a treatment for a short period of time, though cross-linking occurs on the surface, the interior does not gel and when the sol portion is eluted, the sample becomes hollow.

The same procedures as used in Example 2 were used in determining the rate of gelled portion of nylon in Tables III and IV, below, and also in the subsequent examples.

TABLE III.—EFFECT OF TREATMENT TIME (AQUEOUS SOLUTION)

| | Treatment Time, min. | | | | |
|---|---|---|---|---|---|
| | 3 | 5 | 10 | 30 | 60 |
| Rate of Gelled Portion, percent | 18 | 48 | 54 | 58 | 58 |

TABLE IV.—EFFECT OF TREATMENT TIME (GAS)

| | Treatment Time, min. | | | | | |
|---|---|---|---|---|---|---|
| | 3 | 5 | 10 | 30 | 60 | 120 |
| Rate of Gelled Portion, percent | 0 | 15 | 26 | 40 | 45 | 48 |

Example 4

This example illustrates the effect of the treatment temperature. The rates of gelled portion were as in Table V when the samples as used in Example 3, after being subjected to irradiation and dipped in the acetylene aqueous solution, as in said example, were scaled so as to prevent the escape of the acetylene and then heated. In contrast, when, under identical condition the samples were subjected to irradiation only, they all dissolved and gelation did not occur. On the other hand, when the samples were treated in acetylene gas after being subjected to irradiation, the results as shown in Table VI were obtained. While in both cases the cross-linking reaction is accelerated by treatment at higher temperatures, the effects are more pronounced in the case of the treatment by means of the aqueous solution.

TABLE V.—EFFECT OF TREATMENT TEMPERATURE (AQUEOUS SOLUTION)

| | Rate of Gelled Portion, percent | | |
|---|---|---|---|
| Temperature, ° C. | 20 | 40 | 60 |
| Temperature Time, min.: | | | |
| 2 | 0 | 46 | 58 |
| 3 | 18 | 53 | 65 |
| 5 | 48 | 64 | 76 |
| 10 | 54 | 66 | 78 |

TABLE VI.—EFFECT OF TREATMENT TEMPERATURE (GAS)

| | Rate of Gelled Portion, percent | | |
|---|---|---|---|
| Temperature, ° C. | 20 | 40 | 60 |
| Treatment Time, min.: | | | |
| 2 | 0 | 0 | 0 |
| 3 | 0 | 5 | 17 |
| 5 | 15 | 23 | 33 |
| 10 | 26 | 35 | 47 |

EXAMPLE 5

This example illustrates the effect of the concentration of the acetylene. A nylon-6 tire cord was subjected in open air to irradiations of 1 mrad and 10 mrads of electron rays while a nylon-6 film 0.5 mm. in thickness was likewise irradiated with 10 mrads of electron rays. Then the tire cord and film were dipped for 1 hour at 20° C. in acetylene aqueous solution of varied concentration as indicated in the following Table VII. The rates of gelled portion so obtained are shown in said Table VII.

TABLE VII.—EFFECT OF ACETYLENE CONCENTRATION

| Sample and Dose Irradiated | Rate of Gelled Portion, percent | | | | | | |
|---|---|---|---|---|---|---|---|
| | Acetylene Concentration (G$C_2H_2$/l $H_2O$) | | | | | | |
| | 0.006 | 0.01 | 0.06 | 0.1 | 0.36 | 0.6 | 1.2 |
| Tire cord, 1 mrad | 0 | 0 | 0 | 0 | 49 | 53 | 50 |
| Tire cord, 10 mrads | 0 | 0 | 37 | 44 | 47 | 48 | 50 |
| Film, 10 mrads | 65 | 74 | 89 | 91 | 87 | 94 | 94 |

EXAMPLE 6

This example illustrates the effect of the pH of the acetylene aqueous solution. In Table VIII are shown the rates of gelled portion obtained when a nylon-6 tire cord and a 0.5 mm.-thick nylon-film, after being subjected in open air to irradiation of 1 mrad of electron rays, were saturated with acetylene at 20° C. and then treated by dipping for 2 hours at 20° C. in an aqueous solution whose pH had been changed by the addition of either acetic acid or ammonia. From the results shown in Table VIII it cannot be observed that the pH had any substantial effects on the rate of gelled portion obtained.

TABLE VIII.—EFFECT OF THE pH OF ACETYLENE AQUEOUS SOLUTION

| | Rate of Gelled Portion, percent | |
|---|---|---|
| | Tire Cord | Film |
| pH of $C_2H_2$ Aqueous Solution: | | |
| 3 | 40 | 86 |
| 5 | 36 | 84 |
| 7 | 41 | 91 |
| 8 | 39 | 86 |
| 10 | 34 | 90 |

EXAMPLE 7

A film 0.42-mm. thick made with a hot press from polyethylene obtained by the low pressure process (trade name "Hizex," Mitsui Petrochemical K.K.) was subjected in vacuum to irradiation of 3 mrads of gamma rays of cobalt-60. This film was then treated for 2 hours with solutions obtained by dissolving acetylene in various solvents (0° C.). The degrees of cross-linking and rates of gelled portion (extraction solvent xylene, extraction time 20 hours, extraction temperature 110° C.) obtained are shown in Table IX.

TABLE IX

| Solvent (0.° C.) | Concentration (Saturated with 1 atmosphere of acetylene) | Rate of Gelled Portion, percent |
|---|---|---|
| Water | 1.4 g./l. | 42 |
| Acetone | 29–41 | 35 |
| Ethanol | 7–8 | 30 |
| Liquid paraffin | 1.2 | 30 |
| Monochlorobenzene | 0.7 g./100 g. solvent | 35 |

From the results shown in Table IX, above, it can be seen that in using acetylene as an inert solvent solution the effects are exceedingly great when it is used as an aqueous solution. It is a surprising fact that the aqueous solution exhibits greater effects, though it is possible to obtain a higher concentration of the acetylene by using a good solvent such as acetone.

EXAMPLE 8

This example illustrates the instance in which the cross-linking operation is effected by first causing the acetylene to be absorbed into the sample and then subjecting the sample to irradiation. The rates of gelled portion of a 0.5-mm.-thick nylon-6-undrawn film, dipped for 24 hours at room temperature in an aqueous solution saturated with acetylene and then subjected in open air immediately to irradiation of electron rays by means of the Van de Graaff's electron accelerator, are as shown in Table X. In contrast, when the sample is only dipped in the acetylene aqueous solution, it would dissolve completely but would not gel. On the other hand, when the sample, after being treated similarly in acetylene gas, is subjected similarly to irradiation, the rates of gelled portion obtained were as shown in Table XI.

TABLE X.—CROSS LINKING BY POST-IRRADIATION (AQUEOUS SOLUTION)

| | Dose Irradiated, mrad | | | | |
|---|---|---|---|---|---|
| | 0.2 | 0.5 | 1 | 2 | 5 |
| Rate of Gelled Portion, percent | 72 | 75 | 78 | 77 | 80 |

TABLE XI.—CROSS LINKING BY POST-IRRADIATION (GAS)

| | Dose Irradiated | | |
|---|---|---|---|
| | 0.5 | 1 | 5 |
| Rate of Gelled Portion | 28 | 31 | 48 |

EXAMPLE 9

This and the subsequent examples illustrate the results obtained when polymers have been subjected to irradiation in acetylene gas.

The various polymeric films or chips listed in the following Table XII were placed in glass ampoules fitted with a cock, and after removing the air under reduced pressure of about $10^{-3}$ mm. Hg, acetylene was introduced until the pressures listed in Table XII were attained, following which the cock was closed and the ampoules were subjected to irradiation of gamma rays of cobalt-60 at room temperature.

The conditions of the treatment and the rates of gelled portion resulting are as shown in said Table XII. It can be seen that the use of acetylene greatly accelerates the cross-linking reaction with a mild irradiation dose.

TABLE XII

| Polymer | Irradiation Conditions | Rate of Gelled Portion, Percent | | | Condition Under which Rate of Gelled Portion Determined |
|---|---|---|---|---|---|
| | | Dose | | | |
| | | 2 mrads | 5 mrads | 10 mrads | |
| Polyethylene (High pressure process) | Vacuum | 0 | 30 | 56 | Xylene 100° C., 20 hours. |
| Do | Acetylene 300 mm. Hg | 20 | 54 | 74 | |
| Do | Acetylene 600 mm. Hg | 26 | 65 | 80 | |
| Polyethylene (Low pressure process) | Vacuum | 0 | 25 | 46 | Xylene 110° C., 20 hours. |
| Do | Acetylene 300 mm. Hg | 64 | 74 | 92 | |
| Do | Acetylene 600 mm. Hg | 57 | 86 | 94 | |
| Nylon-6 | Vacuum | 0 | 0 | | Metacresol 90° C., 4 hours. |
| Do | Acetylene 300 mm. Hg | 9 | 14 | | |
| Ethylene polyacrylate | Vacuum | 60 | 64 | 77 | Acetone 20° C., 24 hours. |
| Do | Acetylene 300 mm. Hg | 87 | 78 | 92 | |
| Do | Acetylene 600 mm. Hg | 72 | 89 | 94 | |
| Ethylene-propylene copolymer | Vacuum | 0.9 | 5 | 6 | Xylene 100° C. 20 hours. |
| Do | Acetylene 300 mm. Hg | 9 | 12 | 23 | |
| Do | Acetylene 600 mm. Hg | 9 | 16 | 29 | |
| Polyvinyl chloride | Vacuum | 0 | 0 | 0 | Tetrahydrofuran 20° C., 24 hours. |
| Do | Acetylene 300 mm. Hg | 0 | 8.2 | 14 | |
| Do | Acetylene 600 mm. Hg | 0 | 19 | 35 | |

EXAMPLE 10

Nylon yarn was placed in a glass vessel fitted with a cock and then, after discharging the air to about 1 mm. Hg, 1 atmosphere of acetylene gas was introduced. Then the vessel was sealed and subjected to irradiation of gamma rays at room temperature. The following results were obtained in accordance within the changes in dosage irradiated.

TABLE XIII

|  | Dose Irradiated | | | | |
|---|---|---|---|---|---|
|  | 0.02 | 0.1 | 0.2 | 1 | 2 |
| Rate Gelled Portion, Percent | 0 | 51 | 53 | 72 | 81 |

EXAMPLE 11

In this example the effect of a change in the acetylene pressure on nylon was investigated. Nylon yarn was subjected to irradiation of 0.2 mrad of gamma rays in acetylene gas under identical conditions as in Example 10.

In this case, the acetylene pressure was varied to as high as 1500 mm. Hg. It was found that the rate of gelled portion was, for the most part, constant at about 55% with respect to variations in the pressure between 400 mm. Hg to 1500 mm. Hg. However, when the acetylene pressure was lowered to below 300 mm. Hg, the gelation declined abruptly and at below 200 mm. Hg no gelation occurred at all.

EXAMPLE 12

In this example the effect of the air present during the irradiation was investigated. The experiment was conducted as in Example 10 except that the removal of air which was carried out first was not accomplished perfectly. Acetylene gas was introduced to a given pressure of air until the over-all pressure reached 1 atmosphere and then irradiation with 0.25 mrad of gamma rays was effected. The degree of gelation showed no change at an air pressure of the order of about below 10 mm. Hg, but when the air pressure became greater than this, gelation decreased abruptly and at above 200 mm. Hg no gelation took place at all.

EXAMPLE 13

In this example the effect of the temperature at the time of the irradiation was investigated. When nylon yarn was placed in a glass vessel in which had been sealed acetylene at 400 mm. Hg and it was subjected to 0.15 mrad while varying the temperature between room temperature and 100° C., the following results were obtained. Namely, it was found that the cross-linking was not enhanced much even though the temperature was raised.

TABLE XIV

|  | Irradiation Temperature, ° C. | | | |
|---|---|---|---|---|
|  | 25 | 50 | 75 | 100 |
| Rate of Gelled Portion, Percent | 43 | 57 | 56 | 59 |

EXAMPLE 14

As in Example 10, 0.02-mm.-thick polypropylene film was irradiated with gamma rays in acetylene gas. Results shown in Table XV were obtained. In this case, the rate of gelled portion was obtained by heating for 2 hours at 135° C. using Tetralin as the solvent.

TABLE XV

|  | Dose Irradiated, Mrad | | |
|---|---|---|---|
|  | 0.01 | 0.1 | 1 |
| Rate of Gelled Portion, Percent | 1.2 | 53 | 68 |

That which was only irradiated under vacuum did not gel at all.

EXAMPLE 15

A 276-denier poly-4-methyl pentene-1 monofilament was placed in a glass vessel fitted with a vacuum cock and then, after discharging the air therefrom to about 1 mm. Hg, acetylene gas at 600 mm. Hg was introduced. The vessel was then sealed and was subjected to irradiation of gamma rays of cobalt-60 (dose rate of $7 \times 10^4$ rads/hr.) at room temperature. The results obtained are shown in the following Table XVI.

TABLE XVI

|  | Dose Irradiated, mrad | | | |
|---|---|---|---|---|
|  | 0.02 | 0.1 | 0.5 | 0.1 |
| Rate of Gelled Portion, Percent | 0 | 10 | 50 | 80 |

In this case the rate of gelled portion was determined as follows:

The sample was dipped for 2 hours at 135° C. in Tetralin, after which the sol portion was replaced with acetone and washed followed by vacuum drying. The rate was then calculated from the pre- and post-extraction weights.

What is claimed is:

1. In a process for reforming a polymer by cross-linking which consists of subjecting a high polymer selected from the group consisting of polyamides, polymerized 1-olefins, polymerized acrylic acid esters and methacrylic acid esters, polyacrylonitrile, polyvinyl chloride and rubbery polymers predominantly of polymerized butadiene to irradiation by ionizing irradiation and setting up cross-linkages therein to reform said polymer, the improvement which comprises bringing said polymer into intimate contact with acetylene immediately before, during or immediately after the irradiation, said acetylene being in the form of acetylene gas alone, said acetylene gas being employed at a pressure of from 300 mm. Hg to 3 atmospheres.

2. The process of claim 1 wherein said ionizing radiation is at least one radiation selected from the group consisting of electron, neutron, alpha, beta, gamma, X, ultraviolet, proton and deuteron rays.

3. The process of claim 1 wherein said ionizing radiation is electron rays and the dose irradiated is 0.01–20 mrads.

4. In a process for reforming a polymer by cross-linking which consists of subjecting a high polymer selected from the group consisting of polyamides, polymerized 1-olefins, polymerized acrylic acid esters and methacrylic acid esters, polyacrylonitrile, polyvinyl chloride and rubbery polymers predominantly of polymerized butadiene to irradiation by ionizing irridation and setting up cross-linkages therein to reform said polymer, the improvement which comprises bringing said polymer into intimate contact with acetylene immediately before, during or immediately after the irradiation, said acetylene being in the form of a mixed gas of acetylene with an inert gas, said mixed gas being employed at a pressure of from 300 mm. Hg to 3 atmospheres.

5. The process of claim 4 wherein said ionizing radiation is at least one radiation selected from the group consisting of electron, neutron, alpha, beta, gamma, X, ultraviolet, proton and deuteron rays.

6. The process of claim 4 wherein said ionizing radiation is electron rays and the dose irradiated is 0.01–20 mrads.

7. In a process for reforming a polymer by cross-linking which consists of subjecting a high polymer selected from the group consisting of polyamides, polymerized 1-olefins, polymerized acrylic acid esters and methacrylic acid esters, polyacrylonitrile, polyvinyl chloride and rubbery polymers predominantly of polymerized butadiene to irradiation by ionizing irradiation and setting up cross-linkages therein to reform said polymer, the improvement which comprises bringing said polymer into intimate contact with acetylene immediately before, during or immediately after the irradiation, said acetylene being in the form of an inert solvent solution of acetylene, the concentration of acetylene in said inert solvent solution being from 0.01 to 20 g./l.

8. The process of claim 7 wherein said ionizing radiation is at least one radiation selected from the group consisting of electron, neutron, alpha, beta, gamma, X, ultraviolet, proton and deuteron rays.

9. The process of claim 7 wherein said ionizing radiation is electron rays and the dose irradiated is 0.01–20 mrads.

References Cited
UNITED STATES PATENTS
3,188,165  6/1965  Magat et al. _____ 8—115.5

MURRAY TILLMAN, *Primary Examiner.*

R. B. TURNER, *Assistant Examiner.*